United States Patent Office 3,169,704
Patented Feb. 16, 1965

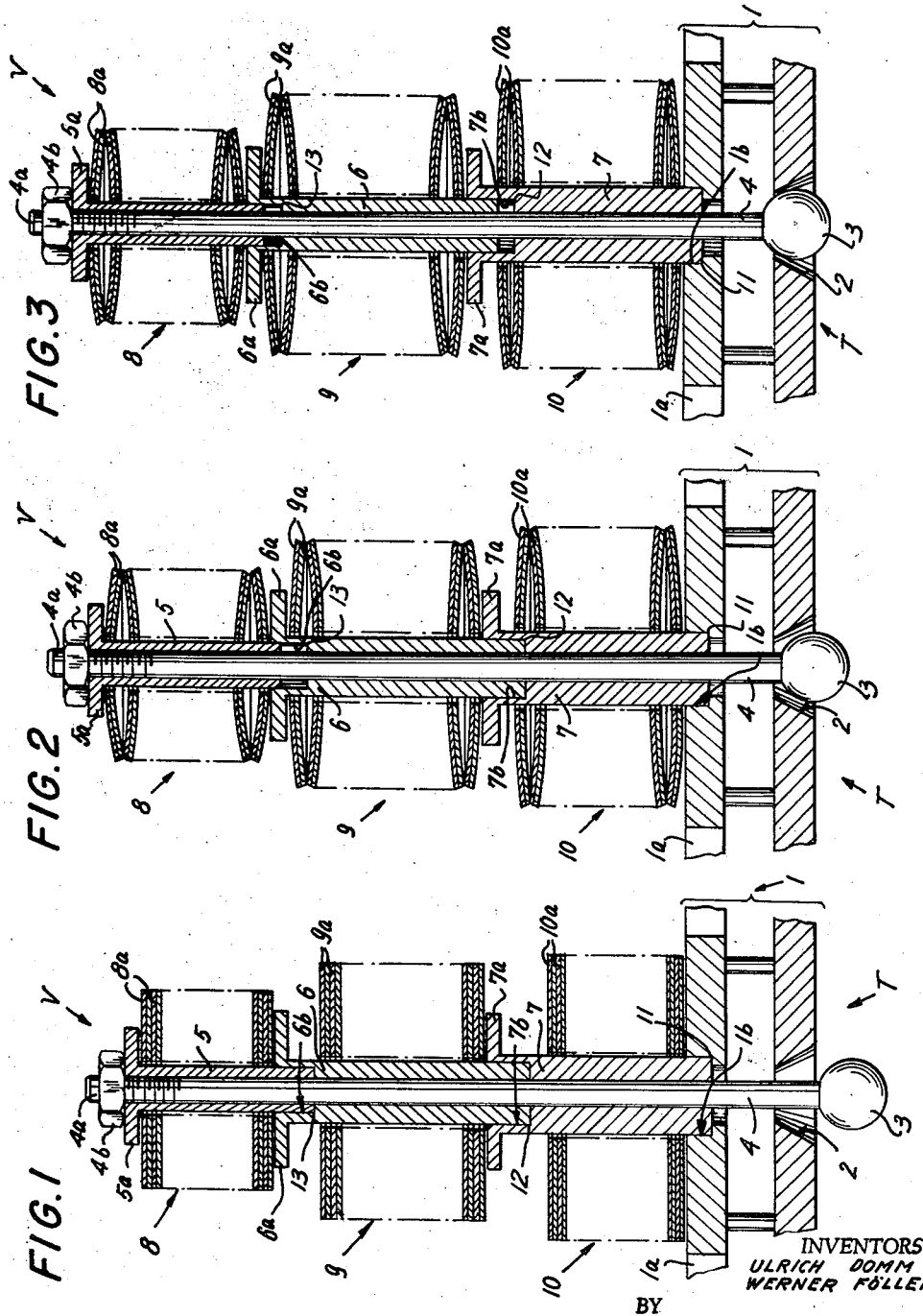

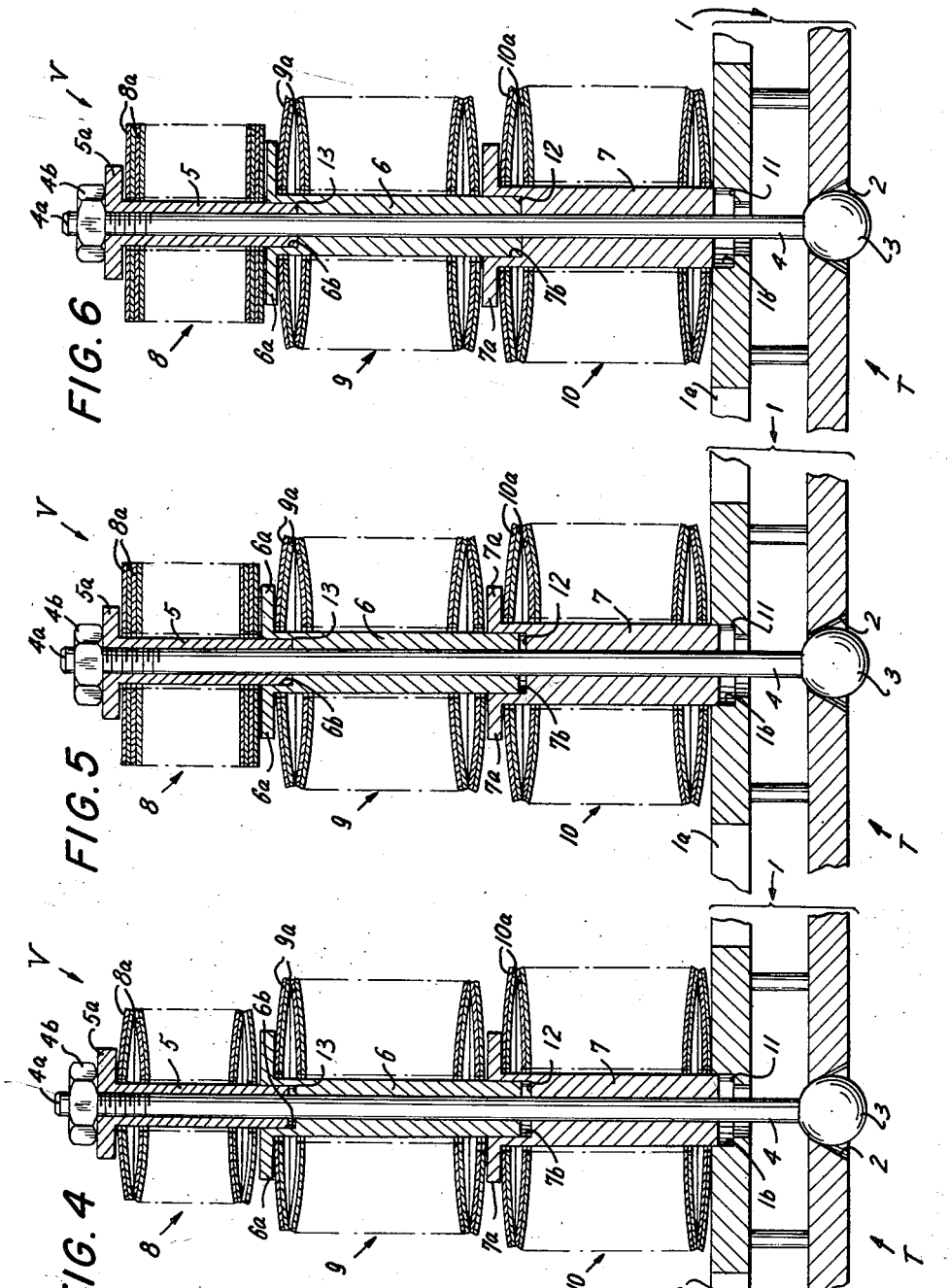

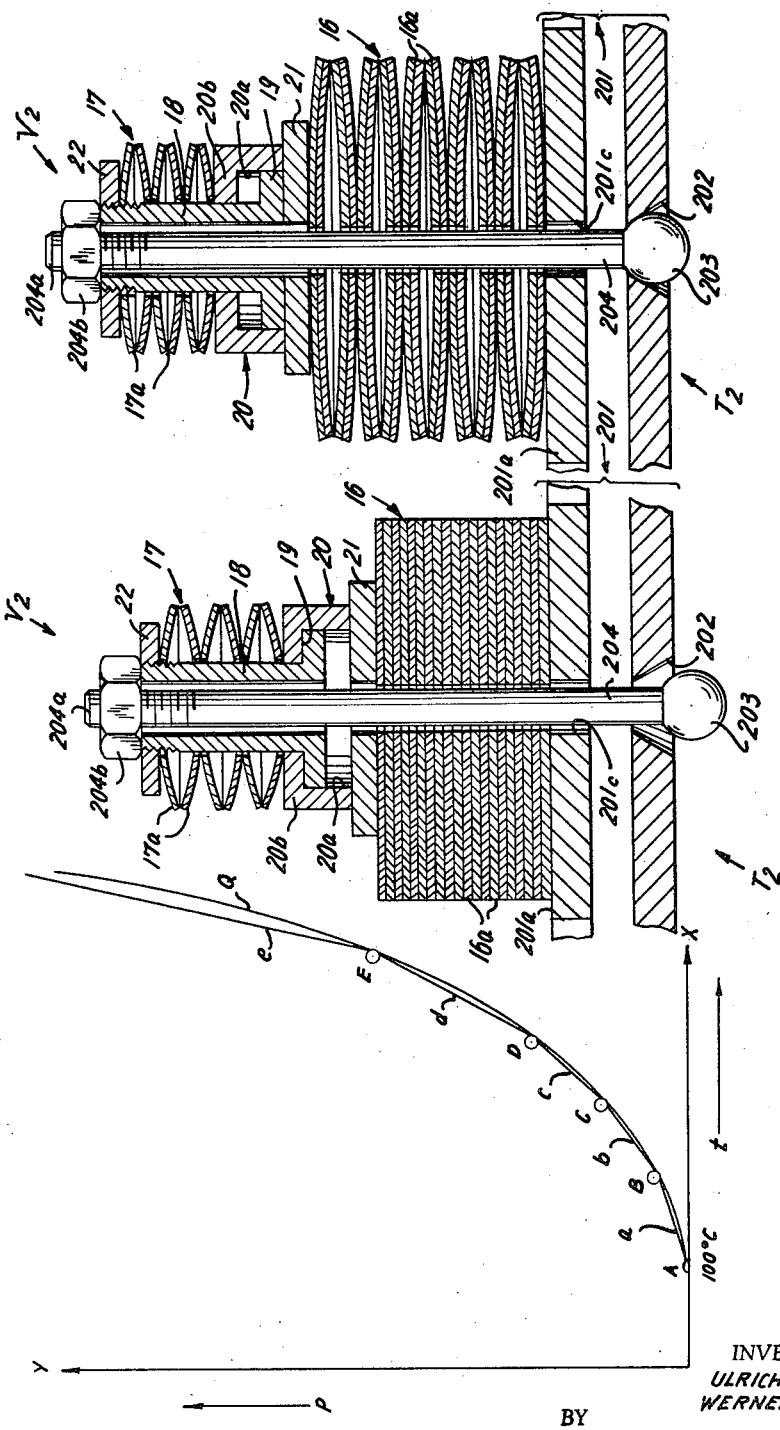

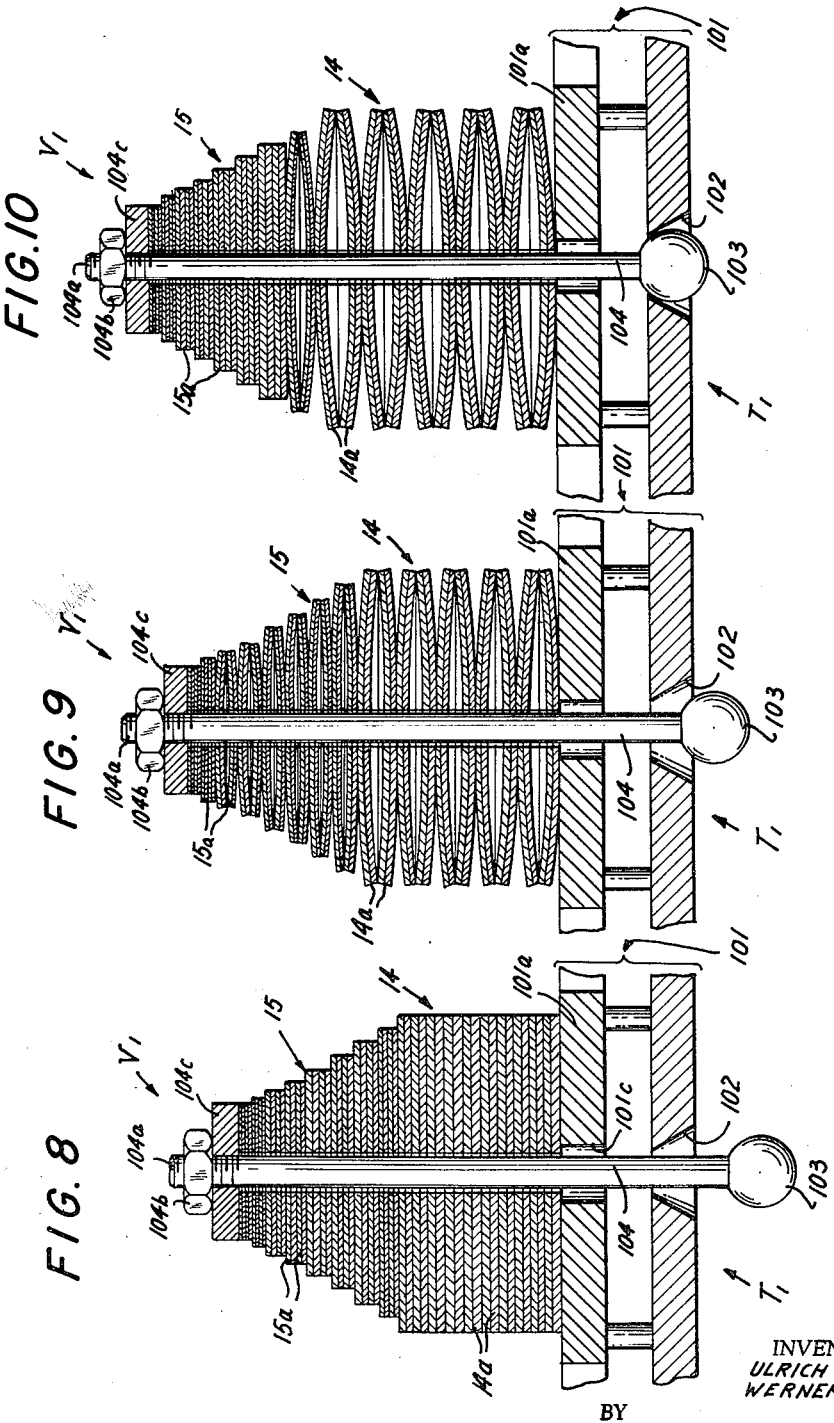

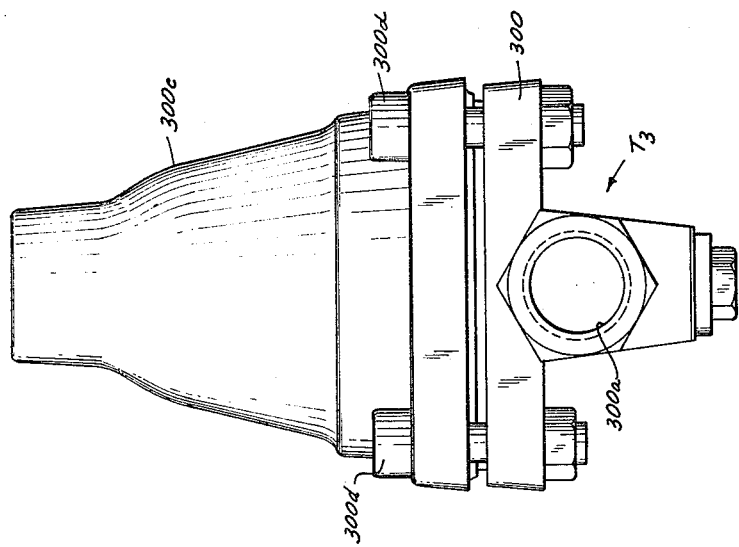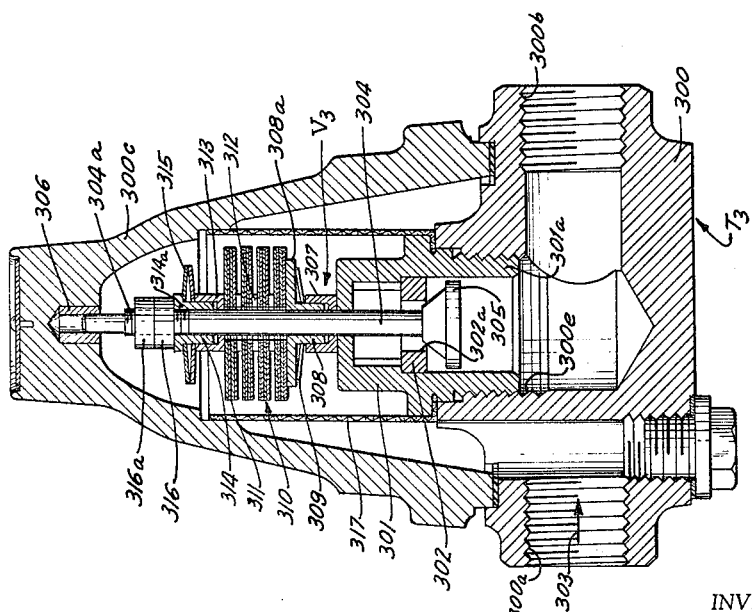

3,169,704
THERMOSTATICALLY ACTUATED VALVE
Ulrich Domm and Werner Föller, Frankenthal, Pfalz, Germany, assignors to Klein, Schanzlin & Becker Aktiengesellschaft, Frankenthal, Pfalz, Germany
Filed Mar. 19, 1962, Ser. No. 180,571
Claims priority, application Germany, May 25, 1961, K 43,820
20 Claims. (Cl. 236—59)

The present invention relates to thermostatically actuated valves in general, and more particularly to a thermostatically actuated valve which is especially suited for use as a drain valve in steam traps. Still more particularly, the invention relates to a valve whose sealing force increases proportionally with the temperature and pressure of a fluid which is contained in a steam trap.

An important object of the invention is to provide a thermostatically actuated valve whose sealing force may be varied in a fully automatic way and within a very wide range so as to conform the sealing force to the pressure of the fluid whose escape must be prevented.

Another object of the invention is to provide a valve of the just outlined characteristics which is constructed and assembled in such a way that its sealing force increases gradually in response to increasing pressure of an entrapped fluid and which is adapted to respond immediately or very rapidly to changes in temperature and to resultant changes in pressure of the entrapped fluid.

A further object of the invention is to provide a thermostatically actuated valve whose sealing force may be adjusted independently of changes in the temperature of the entrapped fluid.

An additional object of our invention is to provide a valve of the above outline characteristics which is especially suited for use as a means for preventing escape of steam from a steam trap and which automatically conforms its sealing force to the pressure of entrapped steam not only up to but also beyond the saturation point of the steam. A concomitant object of the invention is to provide a valve of the above described type which is constructed and assembled in such a way that its sealing force is reduced gradually in response to gradually diminishing steam pressure and that its sealing force diminishes at the same rate at which its sealing force increases in response to rising pressure of the steam.

A further object of the invention is to provide a thermostatically actuated valve which may be readily taken apart for the purpose of inspection or replacement of its parts, which may be readily installed in many types of known steam traps, and whose sealing action changes little or remains unchanged for extensive periods of time.

With the above objects in view, the invention resides in the provision of a thermostatically actuated valve for sealing the outlet means of a fluid-containing device in response to changes in temperature of the fluid, e.g. for sealing the condensate-discharging port of a steam trap in response to changes in temperature of water or steam, the valve comprising a valve member which is movable with respect to the steam trap so as to advance its sealing portion into and away from sealing engagement with the steam trap and to thereby respectively seal and expose the port, and means for moving the valve member into sealing engagement with the steam trap and for varying the sealing force of the sealing portion in response to changes in temperature of the fluid (i.e. water or steam). This moving means comprises at least one heat-expandable column of bimetallic elements or group of superposed bimetallic elements located at least partially within and heatable by the fluid contained in the steam trap for moving the sealing portion of the valve member into sealing engagement with the steam trap with a force which increases in response to increasing temperature of the fluid, and means for transmitting the force generated by the expanding column to the valve member. This force transmitting means comprises at least one motion transmitting assembly in the form of one or more bimetallic columns or one or more springs which is elastically deformable by the column at least at elevated temperatures of the fluid and which, when deformed, cooperates with the column to resist the pressure of fluid and to maintain the sealing portion of the valve member in engagement with the steam trap.

The novel features which are considered as characteristic of the invention are set forth in particular in the appended claims. The invention itself, however, as to its construction and operation, together with additional objects and advantages thereof, will be best understood from the following detailed description of certain specific embodiments with reference to the accompanying drawings, in which:

FIG. 1 is a longitudinal central section through a thermostatically actuated valve which is constructed in accordance with one embodiment of our invention and which is shown in idle position;

FIG. 2 is a similar section showing the valve in operative position in which only the weakest of its three heat-expandible bimetallic columns produces a sealing force;

FIG. 3 is a further longitudinal section through the valve of FIGS. 1 and 2, showing the valve in a position in which two of its three bimetallic columns cooperate to produce a greater sealing force;

FIG. 4 illustrates the valve of FIGS. 1 to 3 in a position in which each of its three bimetallic columns produces a sealing force;

FIG. 5 shows the valve of FIGS. 1 to 4 in a position in which the weakest bimetallic column is inactivated and merely serves as a component part of the means which transmits motion and sealing force produced by the two stronger columns to the valve member;

FIG. 6 shows the valve of FIGS. 1 to 5 in a position in which only the strongest bimetallic column produces a sealing force;

FIG. 7 is a diagram showing the relationship between a curve which represents the changes in sealing force of the valve and a curve which represents the temperature-dependent changes in pressure of a fluid whose escape is controlled by the valve of FIGS. 1 to 6;

FIG. 8 is an axial section through a modified valve which comprises only two bimetallic columns, showing the valve in idle position which it assumes at a certain temperature of the fluid;

FIG. 9 shows the valve of FIG. 8 in sealing position in which the two columns cooperate to produce a sealing force necessary to prevent escape of fluid at an elevated temperature;

FIG. 10 shows the valve of FIGS. 8 and 9 in a position in which only the stronger of the two columns produces a sealing force;

FIG. 11 is an axial section through a different thermostatically actuated valve which comprises a single bimetallic column and an elastically deformable motion transmitting assembly consisting of a package of dished springs, the valve being shown in idle position;

FIG. 12 shows the valve of FIG. 11 in operative position;

FIG. 13 is an axial section through a valve which constitutes a modification of the valve shown in FIG. 11; and FIG. 14 is a side elevational view of the valve shown in FIG. 13.

Referring now in greater detail to the illustrated embodiments, and first to FIGS. 1 to 6, there is shown a thermostatically actuated valve V which is mounted in a fluid-containing device here shown as a steam trap T and which is adapted to expose or to seal with variable force an outlet in the form of a port 2 provided in the housing 1 of the steam trap. The valve V comprises a valve member in the form of an elongated stem or rod 4 which is provided at its outer end with a spherical sealing portion or head 3 adapted to expose the port 2 at water (room) temperature and to seal the port at a temperature at which water contained in the steam trap T is transformed to steam. The valve stem 4 is axially slidably received in three cooperating sleeves 5, 6 and 7. The flange 5a of the inner sleeve 5 is adjacent to a combined retaining, motion and force transmitting and adjusting nut 4b which is screwed onto the externally threaded inner end portion 4a of the stem 4. The outer end of the sleeve 5 is slidably received in a coaxial recess 6b provided in the flanged inner end of the intermediate or median sleeve 6 and, at water temperature (FIG. 1), the outer end of the sleeve 5 abuts against a stop in the form of an internal shoulder 13 constituting the bottom end wall of the recess 6a. The outer end of the median sleeve 6 is slidably received in a coaxial recess 7b provided in the flanged inner end of the outer sleeve 7 and, at water temperature, the inner end of the sleeve 6 abuts against or rests on a stop defined by an internal shoulder 12 constituting the bottom end wall of the recess 7b. A similar recess 1b is provided in the fixed valve-supporting portion 1a of the housing 1, and a shoulder 11 at the bottom of the recess 1b serves as a stop for the outer end of the sleeve 7 when the valve V is idle, i.e. when the steam trap T is maintained at water temperature. The sleeves 5 to 7 are axially movable along the valve stem 4.

A first elastically deformable assembly here shown as a column 8 consisting of disk-shaped apertured bimetallic elements 8a is slidably mounted on the inner sleeve 5 and is disposed between the flanges 5a, 6a of the sleeves 5, 6, respectively. A second elastically deformable assembly or column 9 consisting of disk-shaped apertured bimetallic elements 9a is slidably mounted on the median sleeve 6 and is located between the flanges 6a, 7a of the sleeves 6, 7, respectively. The diameters of the elements 9a are greater than the diameters of the elements 8a but smaller than the diameters of apertured bimetallic elements 10a which form a third column 10 and which are slidably mounted on the sleeve 7 between the flange 7a and the inner side of the fixed housing portion 1a. The expansive force of the columns 10 and 9 is respectively greater than the expansive force of the columns 9 and 8, and the arrangement is preferably such that, at water temperature, the outer ends of the sleeves 5, 6 and 7 respectively rest on the stop shoulders 13, 12 and 11 (FIG. 1). The axial length of the columns 8, 9 and 10 is then reduced to a minimum and these columns merely rest on the flanges 6a, 7a and on the fixed housing portion 1a which latter constitutes a stationary abutment for one axial end of the column 10. It will be noted that, in the position of FIG. 1, the distance between the flanges 5a, 6a exceeds only slightly or equals the axial length of the column 8, that the distance between the flanges 6a, 7a exceeds substantially the axial length of the column 9, and that the axial length of the column 10 is much less than the distance between the flange 7a and the inner side of the fixed housing portion 1a.

The columns 8, 9 and 10 constitute three direct expansion type bimetallic thermostats which are utilized as a means for selectively or simultaneously applying sealing force to and for moving the head 3 into sealing engagement with the walls bounding the port 2.

The valve V is operated in the following manner:

When the steam trap T contains water at room temperature or at elevated temperature but below the boiling point, the axial length of each of the columns 8, 9, 10 is automatically reduced so that the sleeves 5–7 rest on the respective stop shoulders 13, 12, 11 and that the sealing portion or head 3 is spaced from the outlet or port 2 whereby the interior of the steam trap is free to communicate with the atmosphere so as to discharge the condensate (FIG. 1). For example, up to 100° C., the valve V enables the port 2 to serve as a ventilating opening for the apparatus of which the steam trap T constitutes a component part.

If the temperature in the steam trap T rises above 100° C., the elements 8a of the column 8 begin to bend so as to axially expand this column whereby the flange 5a is automatically moved inwardly and away from the flange 6a, i.e. the sleeve 5 is caused to slide outwardly in its recess 6b away from the shoulder 13 and entrains the nut 4b so as to move the head 3 into sealing engagement with the walls forming part of the steam trap T and bounding the port 2. The interior of the steam trap is now sealed from the atmosphere (FIG. 2). It will be noted that, in the position of FIG. 2, the columns 9 and 10 also begin to expand but that the extent of their axial expansion is insufficient to move these columns into abutment with the flanges 6a, 7a.

In the diagram of FIG. 7, in which the water or steam temperature t prevailing in the steam trap T is measured along the X-axis and in which the steam pressure P prevailing in the steam trap is measured along the Y-axis, the curve Q is the steam curve and the straight line a between the points A, B indicates the increasing sealing force of the valve V in the first stage of operation after the temperature rises above 100° C.

If the temperature t (and hence the pressure P) rises to the value C (FIG. 7), the column 8 reaches its maximum axial length but the column 9 also continues to expand and begins to bear against the flange 6a so as to move the sleeve 6 upwardly, as viewed in FIG. 3, and away from the stop shoulder 12 whereby the force of the expanding column 9 begins to overcome the force of the fully expanded but weaker column 8 and the latter is compressed in response to axial movement of the flange 6a toward the flange 5a. The columns 8 and 9 now operate simultaneously and in dependency on each other, and their sealing force is represented in FIG. 7 by the straight line b between the points B, C. The column 10 continues to expand but its axial expansion is still insufficient to cause axial displacement of the sleeve 7 (FIG. 3).

In the next stage which is illustrated in FIG. 4, the axial expansion of the column 10 is such that its innermost element 10a bears against the flange 7a and moves the sleeve 7 in a direction away from the stop shoulder 11 to thereby compress the column 9. This is illustrated in FIG. 7 by the straight line c between the points C, D, and the sealing force of the valve V is now greater than in the position of FIG. 3 because the column 10 is stronger than the column 9 or 8.

The forces developing during axial expansion of the columns 8–10 are selected in such a way that, at the time the steam temperature t reaches or slightly exceeds the value D, the axially expanded column 9 and the nearly fully expanded column 10 bring about complete compression of the column 8, i.e. the inner sleeve 5 returns into abutment with the stop shoulder 13 (FIG. 5). Thus, the column 8 ceases to exert sealing force on the valve head 3 as soon as the expansion of the columns 9 and 10 reaches the stage illustrated in FIG. 5, i.e. the sealing force is now provided by the cooperating columns 9 and 10 whose interdependent sealing action is illustrated in FIG. 7 by the straight line d between the points D, E. At the time the steam temperature reaches the value E, the sealing force is provided solely by the column 10 which has compressed the weaker column 9 to the extent necessary to move the stop shoulder 12 into abutment with the sleeve 6 (FIG. 6). Since the curve Q of saturated steam at the point beyond the value E assumes the shape of a nearly straight line, the column 10 is adapted to hold by itself the valve head 3 in sealing engagement with the fluid-containing device T, namely, with the walls of the port 2.

When the temperature $t$ (and hence the pressure P) begins to drop, the column 10 starts to contract and permits expansion of the column 9 which latter, in turn permits expansion of the column 8 in response to further drop in temperature so that the columns 8 to 10 return to the position of FIG. 1 when the temperature in the steam trap drops to or below 100° C. In other words, the operation of the valve V in response to progressive cooling of the steam trap is just the reverse of the operation which takes place when the temperature and pressure in the steam trap rise to and beyond the value E of FIG. 7.

It will be noted that the columns 8–10, the sleeves 5–7 and the nut 4b together constitute a composite means for moving the sealing portion 3 of the valve member 4 into sealing engagement with the fluid-containing device T, and that this composite moving means includes means (comprising the parts 4b and 5–9) for transmitting the expansion of the column 10 to the valve member 4. It will be readily understood that one of the elastically deformable assemblies 8, 9 may be dispensed with or that the valve V may be modified in a sense to utilize three or more assemblies, such as the column 8 or 9, which are elastically deformable by the column 10 at least at elevated temperatures of the fluid (steam) contained in the device T. When elastically deformed, the assemblies 8, 9 cooperate with the column 10 to maintain the sealing portion 3 in engagement with the device T, either by performing a pure motion-transmitting function (FIGS. 5 and 6) or by contributing a certain sealing force produced by the column 10.

FIG. 7 shows that the number of straight lines ($a$, $b$, $c$, $d$, $e$) each of which represents a different condition of automatic adjustment of the valve V in sealing position of the sealing portion 3 equals $2n-1$, wherein $n$ is the number of columns in the valve. Thus, if the valve V would utilize only two columns (e.g. 9 and 10), the number of conditions of adjustment would be reduced to three.

An important advantage of our improved valve is that the curve consisting of lines $a$–$e$ closely approximates the steam curve Q which means that the sealing force of the moving means for the valve member 4 increases proportionally with increasing pressure of the fluid. This differentiates the improved valve from certain conventional valves which produce a stepwise rather than gradually increasing sealing force.

FIGS. 8 to 10 illustrate a modified valve $V_1$ which comprises only two columns 14, 15 of apertured bimetallic disks and in which the disk-shaped bimetallic elements 14a, 15a of these columns are slidably mounted directly on a valve member in the form of a valve stem 104. As in the embodiment of FIGS. 1 to 6, the stem 104 is provided with a spherical sealing portion or head 103 and with an externally threaded end portion 104a which meshes with an adjusting and motion transmitting nut 104b. The stem 104 extends loosely through a bore 101c provided in the fixed valve-supporting inner portion 101a of a housing 101 forming part of a fluid-containing device in the form of a steam trap $T_1$.

The pairwise arranged elements 14a of the stronger column 14 abut against the fixed housing portion 101a and their diameters are greater than the diameters of the pairwise arranged elements 15a constituting the second or inner column 15. The column 15 constitutes an elastically deformable motion transmitting assembly. It will be noted that the column 15 consists of pairwise arranged elements whose diameters are not the same, i.e. the diameters of the elements in the column 15 are progressively smaller in a direction from the column 14 to the nut 104b. It is assumed that the larger-diameter elements of the column 15 are stronger than the smaller-diameter elements, that is the larger-diameter elements will generate in response to increasing temperature of the fluid a greater force than that generated by the smaller-diameter elements, but it is equally possible to use elements of equal diameters but of different strength, that is of a different characteristic.

The smallest-diameter (innermost) element of the column 15 bears against a washer 104c which is inwardly adjacent and transmits motion and sealing force to the nut 104b and stem 104.

At water (room) temperature, the elements 14a, 15a of the columns 14 and 15 are flat (FIG. 8) so that the combined axial length of the columns 14, 15 reaches its minimum value. Consequently, the head 103 is spaced from the outlet or port 102 and the interior of the steam trap $T_1$ is free to communicate with the atmosphere, i.e the condensate may escape from the steam trap.

If the temperature of fluid contained in the interior of the steam trap $T_1$ rises, the elements 14a, 15a of the columns 14, 15 begin to bend so that, at 100° C., the combined axial length of the columns 14, 15 is sufficient to move the head 103 into sealing engagement with the walls bounding the port 102 (FIG. 9). It will be noted that, in the position of FIG. 9, the smallest-diameter elements 15a of the column 15 are already flattened in response to pressure exerted by the larger-diameter elements 15a of the column 15 and by the elements 14a of the column 14; consequently, the flattened elements 15a of the column 15 cannot affect the sealing action of the valve $V_1$ and merely serve as a means for transmitting sealing force to the washer 104c and to the nut 104b. If the temperature in the interior of the steam trap $T_1$ continues to rise, the number of flattened elements 15a in the column 15 also increases (see FIG. 10) so that, at a certain temperature, only the elements 14a of the stronger column 14 transmit sealing force to the head 103.

It is normally preferred to assemble the stronger column 14 of bimetallic elements 14a with equal diameters so that, once the column 15 is fully compressed (FIG. 10), the characteristic of the column 14 remains linear or substantially linear which means that the sealing force of this column increases proportionally with nearly linear increase in pressure P prevailing in the steam trap $T_1$ once the steam trap is filled with saturated steam, i.e. once the curve Q assumes the form shown above the point E in FIG. 7. In other words, the sealing force of the valve $V_1$ increases at substantially the same rate as the pressure of saturated steam.

Referring to FIGS. 11 and 12, there is shown a modified thermostatically actuated valve $V_2$ which is mounted in a fluid-containing device again assuming the form of a steam trap $T_2$ and which comprises only one direct expansion type bimetallic thermostat in the form of a column 16. This column includes pairwise arranged apertured disk-shaped bimetallic elements 16a which are freely slidable along a valve member or stem 204, the latter having a sealing portion or head 203 which controls the outlet or port 202 provided in the housing 201 of the steam trap $T_2$. The stem 204 passes through a bore 201c provided in the fixed inner portion 201a of the housing 201 and has an externally threaded inner end portion 204a which meshes with an adjusting and motion transmitting nut 204b. The assembly 15 of FIGS. 8 to 10 (or the composite assembly 8, 9 of FIGS. 1–6) is replaced by an elastically deformable assembly in the form of a package 17 consisting of apertured dished springs 17a and slidably mounted on a sleeve 18 whose upper end abuts against the nut 204b. The outer end of the sleeve 18 is provided with a flange or collar 19 which is received in a cupped motion transmitting element or bell 20, the latter abutting with its annular end face against a plate washer 21 supported by the uppermost element 16a of the column 16. The uppermost dished spring 17a of the assembly 17 bears against a motion transmitting washer 22 which is detachably secured to the sleeve 18 and which bears against the under-side of the nut 204b. It will be noted that the axial length of the internal chamber 20a in the bell 20 is greater than the axial length of the collar 19 so that the sleeve 18 is free to reciprocate with respect to the bell 20 or vice versa.

FIG. 11 illustrates the valve $V_2$ in idle position in which the assembly 17 is fully expanded but the elements 16a of the column 16 are flat so that the axial length of this column has reached its minimum value. Since the washer 22 is secured to the sleeve 18, the assembly 17 is maintained under certain initial compression which is sufficient to move the collar 19 into abutment with the bottom wall 20b of the bell 20. However, the fully collapsed column 16 permits the head 203 to move away from the port 202 and to permit communication between the internal space of the steam trap $T_2$ and the surrounding atmosphere.

If the temperature in the steam trap $T_2$ begins to rise, the elements 16a of the column 16 start to bend and, in response to a predetermined temperature (e.g. 100° C.), the axial expansion of the column 16 is sufficient to move the head 203 into sealing engagement with the walls bounding the port 202 without elastically deforming the assembly 17, i.e. merely by lifting the composite expansion transmitting means 17-21 upwardly with respect to the position of FIG. 11 to the extent necessary to move the head 203 into sealing engagement with the housing 201 of the steam trap $T_2$. Up to such predetermined temperature, the assembly 17 does not influence the sealing action of the valve $V_2$ because the collar 19 remains in abutment with the bottom wall 20b of the bell 20.

However, if the temperature in the steam trap $T_2$ continues to rise the elements 16a of the column 16 continue to bend so that the expansive force of the column 16 reaches and exceeds the expansive force of the assembly 17 whereby the assembly 17 is subjected to progressively increasing compression and permits the collar 19 to move toward and into abutment with the washer 21 (FIG. 12). During movement of the collar 19 from abutment with the bottom wall 20b into abutment with the washer 21, the assembly 17 cooperates with and complements the sealing force of the axially expanding column 16. Once the assembly 17 is fully deformed (FIG. 12), its influence on the sealing force transmitted to the head 203 is terminated and sealing force is now produced solely by the deformed elements 16a of the column 16. The sealing force is transmitted by the washer 21 to the sleeve 18, by the sleeve 18 to the nut 204b, and by the nut 204b to the stem 204, i.e. to the head 203. Before the collar 19 reaches the washer 21, the sealing force is transmitted from the column 16 to the washer 21, from the washer 21 to the bell 20, from the bell 20 to the assembly 17, from the assembly 17 to the sleeve 18 and/or to the washer 22, and from the sleeve 18 and/or washer 22 to the nut 204b.

It is assumed that the valve $V_2$ reaches the position of FIG. 12 at a time when the steam trap $T_2$ is filled with saturated steam so that the pressure of saturated steam is again proportional or nearly proportional to linearly increasing sealing force of the column 16 as soon as the latter fully deforms the assembly 17.

The washer 22 preferably assumes the form of an internally threaded nut which meshes with the externally threaded end portion of the sleeve 18 so as to serve as a means for adjusting the initial bias of the elastically deformable assembly 17.

The main difference between the valve $V_2$ on the one hand and the valves $V$, $V_1$ on the other hand is that the assembly 17 is elastically deformable at normal and at elevated temperatures of the fluid contained in the device $T_2$, whereas the assemblies 8, 9 and 15 are deformable only at elevated temperatures of the fluid contained in the device $T$ or $T_1$. It will be understood that the assembly 17 may be replaced by a helical spring or that the valve $V_2$ may comprise two or more elastically deformable assemblies 17. Such elastically deformable assemblies may be disposed at opposite sides of the column 16, and each assembly may be subjected to initial compression which may but need not be the same. For example, the assembly at one side of the column 16 may comprise comparatively strong springs and the assembly at the other side of the column 16 may comprise weaker springs in the form of coils, apertured disks or the like.

The package 17, the sleeve 18, the bell 20 and the washer 22 may be mounted on the valve member 204 as a preassembled unit, and the initial compression or bias of the package 17 may be adjusted by turning the washer 22 with respect to the sleeve 18. The precompressed package 17 insures that the valve $V_2$ responds immediately to seal the port 202 as soon as the column 16 is subjected to the heating action of steam. Of course, the axially adjustable washer may also serve as a means which compensates for inaccuracies in the curavture, thickness and/or other manufacturing tolerances of the elements 18a.

The aforementioned modification of the valve $V_2$ according to which a column of bimetallic thermostats may be disposed between two resiliently deformable assemblies is shown in FIGS. 13 and 14. The valve $V_3$ of FIGS. 13 and 14 is mounted in a housing 300 of a steam trap $T_3$ which is provided with an inlet 300a and an outlet 300b and which carries a cap 300c secured thereto by bolts 300d. A portion of the housing 300 is internally threaded, as at 300e, to receive the externally thread portion 301a of a yoke 301, the latter accommodating a valve seat 302 having a port 302a. The port 302a provides a passage for the fluid which flows from the inlet 300a to the outlet 300b in the direction indicated in FIG. 13 by the arrow 303.

The stem 304 of the valve $V_3$ has a partly conical and partly cylindrical sealing head 305 whose cylindrical portion is received with certain play in the externally threaded portion 301a and whose conical portion may be drawn into the port 302a to sealingly engage the seat 302. The upper end portion of the stem 304 is slidably received in a bushing 306 provided in the cap 300c.

The upper side of the yoke 301 carries a cup 307 which slidably receives a cylindrical sleeve 308 having at its upper end an outwardly extending annular collar 308a. A single dished spring 309 is inserted between the collar 308a and the upper end face of the cup 307 so that it is slidable about the sleeve 308. This spring constitutes a comparatively weak assembly at one side of a column 310 consisting of pairwise arranged bimetallic thermostats 311 which are separated from each other by washers 312. It will be noted that the column 310 consisting of the thermostats 311 and washers 312 is axially movable along the stem 304 and that the uppermost bimetallic thermostat 311 supports a cup 313 which slidably receives a cylindrical sleeve 314 having at its upper end an annular collar 314a. A comparatively strong second assembly comprising a pair of dished springs 315 is disposed between the collar 314 and the upper end face of the cup 313 so that it is axially movable about the sleeve 314. This sleeve is held in position by a pair of nuts 316, 316a which mate with a threaded portion 304a of the stem 304.

A cylindrical filter 317 is clamped between the yoke 301 and the housing 300 so as to surround the column 310 and the resilient assemblies 309, 315 and to prevent entry of solid impurities into the space occupied by the valve $V_3$.

The operation of the valve $V_3$ will be readily understood. In the inoperative position of FIG. 13, the valve permits a comparatively cool fluid to flow from the inlet 300a through the filter 317 and port 302a to the outlet 300b. When the temperature of the fluid increases, the column 310 begins to expand and deforms the spring 309 by moving the collar 308a toward the cup 307. In the next stage of operation, the column 310 deforms the springs 315 by moving the cup 313 toward the collar 314a. In the final stage of operation, the column 310 continues to expand and moves the valve stem 304 in upward direction to thereby lift the conical portion of the head 305 into sealing engagement with the seat 302.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A thermostatically actuated valve for sealing the outlet means of a fluid-containing device in response to rising temperature of the fluid, comprising a valve member having a sealing portion and movable with respect to the fluid-containing device so as to advance its sealing portion into and away from sealing engagement with the fluid-containing device and to thereby respectively seal and expose the outlet means; and means for moving the valve member under the action of a sealing force into sealing engagement with the fluid-containing device and for varying the sealing force in response to changes in temperature of the fluid as well as for changing the characteristics of said sealing force in different ranges of temperature of the fluid, said last-mentioned means comprising at least one group of superposed heat-expandible bimetallic elements located at least partially within and heatable by the fluid contained in the fluid-containing device for moving said sealing portion into sealing engagement with the fluid-containing device with a sealing force which increases in response to increasing temperature of the fluid and reaches in one range of elevated temperatures a predetermined higher sealing force, and means for transmitting said sealing force generated by the expanding group of superposed bimetallic elements to said valve member, said force transmitting means comprising at least one motion transmitting assembly which is elastically deformable to a predetermined limit by a force at least equal to said predetermined higher sealing force so that said motion transmitting assembly is deformed by said group of superposed bimetallic elements at least in said range of elevated temperatures of the fluid, said motion transmitting assembly being constructed so as to be prevented from further deformation when said limit is reached and which, when deformed, cooperates with said group of superposed bimetallic elements to resist the pressure of the fluid and to maintain said sealing portion in engagement with the fluid-containing device.

2. A valve as set forth in claim 1, further comprising stop means for limiting the compression of said assembly.

3. A valve as set forth in claim 1, wherein said force transmitting means comprises a plurality of motion transmitting assemblies including a weaker first assembly and a stronger second assembly, one of said assemblies interposed between the other assembly and said group of superposed bimetallic elements, and further comprising an operative connection between said other assembly and said valve member, the arrangement being such that at a predetermined fluid temperature said group of superposed bimetallic elements begins to expand and moves said sealing portion into sealing engagement with the fluid containing device, that in response to a rise in fluid temperature said group of superposed bimetallic elements continues to expand and compresses said first assembly to transmit a greater force to said sealing portion, and that in response to a further rise in fluid temperature said group of superposed bimetallic elements again continues to expand and compresses said second assembly to transmit a still greater force to said sealing portion.

4. A valve as set forth in claim 1, wherein said assembly comprises an additional group of superposed heat-expandable bimetallic elements generating in response to increasing temperature of said fluid a smaller force than that generated by said first mentioned group of bimetallic elements.

5. A valve as set forth in claim 1, wherein said assembly comprises at least one resilient element.

6. A valve as set forth in claim 5, further comprising means for subjecting said resilient element to initial compression.

7. A valve as set forth in claim 6, further comprising means for adjusting the initial compression of said resilient element.

8. A thermostatically actuated valve for sealing the outlet means of a fluid-containing device in response to rising temperature of the fluid, comprising a valve member having a sealing portion and movable with respect to the fluid-containing device so as to advance its sealing portion into and away from sealing engagement with the fluid-containing device and to thereby respectively seal and expose the outlet means; and means for moving the valve member under the action of a sealing force into sealing engagement with the fluid-containing device and for automatically varying the sealing force in response to changes in temperature of the fluid as well as for automatically changing the characteristics of said force in different ranges of temperature of the fluid, said last-mentioned means comprising a group of superposed heat-expandible bimetallic elements located at least partially within and heatable by the fluid contained in the fluid-containing device for moving said sealing portion into sealing engagement with the fluid-containing device with a sealing force which increases with increasing temperature of the fluid and reaches in one range of elevated temperatures a predetermined higher sealing force, fixed abutment means engaging with said group of superposed bimetallic elements, and means for transmitting the force of the expanding group of superposed bimetallic elements to said valve member, said force transmitting means comprising at least one additional group of superposed heat-expandible bimetallic elements located at least partially with and heatable by the fluid contained in the fluid-containing device and generating in response to increasing temperature of said fluid a smaller force than that generated by said first mentioned group of bimetallic elements, and an operative connection between said additional group of superposed bimetallic elements and said valve member, said additional group of superposed bimetallic elements elastically deformable to a predetermined limit by a force at least equal to said predetermined higher sealing force so that said motion transmitting assembly is deformed by said first mentioned group of superposed bimetallic elements in said range of elevated temperatures of the fluid, said additional group of superposed bimetallic elements being constructed so as to be prevented from further deformation when said limit is reached, and said additional group of superposed bimetallic elements, when deformed, cooperating with said first mentioned group of superposed bimetallic elements to resist the pressure of the fluid and to maintain said sealing portion in engagement with the fluid-containing device.

9. A valve as set forth in claim 8, wherein said valve member is an elongated stem and wherein said elements are bimetallic disks slidably supported by said stem.

10. A valve as set forth in claim 9, wherein the diameters of bimetallic elements in said first mentioned group are greater than the diameters of bimetallic elements in said additional group.

11. A valve as set forth in claim 10, wherein said additional group comprises bimetallic elements of different diameters.

12. A valve as set forth in claim 8, wherein said force transmitting means comprises a plurality of groups of superposed heat-expandible bimetallic elements including a weaker first additional group of superposed bimetallic elements and a stronger second additional group of superposed bimetallic elements; said second additional group of superposed bimetallic elements interposed between said first mentioned group of superposed bimetallic elements and said first additional group of superposed bimetallic elements and said operative connection being provided between said first additional group of superposed bimetallic elements and said valve member, the arrangement being such that at a predetermined temperature of the fluid said first additional group of superposed bimetallic elements expands and moves said sealing portion into sealing engagement with the fluid-containing device, that in response to a rise in temperature of the fluid, said second additional group of superposed bimetallic elements also expands to progressively compress said first additional group of superposed bimetallic elements and to produce an increasing sealing force for said sealing portion, and that in response to a further rise in temperature said first mentioned group of superposed bimetallic elements also expands and progressively compresses said second additional group of superposed bimetallic elements to produce maximum sealing force for said sealing portion.

13. A valve as set forth in claim 12, further comprising stop means for limiting the extent of compression of said additional groups of superposed bimetallic elements.

14. A thermostatically actuated valve for sealing with variable force the port of a steam trap in response to changes in temperature of the fluid contained in the steam trap, comprising an elongated valve member extending through the port, said valve member having a sealing portion outwardly adjacent to the port and a second portion located in the interior of the steam trap, said valve member movable with respect to the steam trap so as to advance its sealing portion into and away from sealing engagement with the steam trap and to thereby respectively seal and expose the port; and means for moving the sealing portion against and for biasing the sealing portion with variable force into sealing engagement with the steam trap in response to changes in temperature of the fluid as well as for automatically changing the characteristics of said force in different ranges of temperature of the fluid, said moving and biasing means comprising a group of superposed heat-expandible apertured disk-shaped bimetallic elements slidably supported by said valve member intermediate said sealing portion and said second portion, said group of superposed bimetallic elements heatable by the fluid contained in the steam trap for moving said sealing portion into sealing engagement with the steam trap with a sealing force which increases in response to increasing temperature of the fluid and reaches in the range of elevated temperatures a predetermined higher sealing force, and means for transmitting the force generated by the expanding group of superposed bimetallic elements to said valve member, said force transmitting means comprising at least one motion transmitting assembly including an additional group of superposed heat-expandible apertured disk-shaped bimetallic elements generating in response to increasing temperature of said fluid a smaller force than that generated by said first mentioned group of bimetallic elements and being slidably supported by said valve member and elastically deformable to a predetermined extent by a force at least equal to said predetermined higher sealing force so that said motion transmitting assembly is deformed by said first mentioned group of superposed bimetallic elements at least in said range of elevated temperatures of the fluid, said additional group of superposed bimetallic elements being constructed so as to be prevented from further deformation when said extent is reached, whereby when deformed, said last mentioned group of superposed bimetallic elements cooperates with the first mentioned group of superposed bimetallic elements to resist the pressure of fluid and to maintain said sealing portion in engagement with the steam trap, and means for transmitting movements of one of said group of superposed bimetallic elements to said valve member.

15. A thermostatically actuated valve for sealing with variable force the port of a steam trap in response to changes in temperature of the fluid contained in the steam trap, comprising an elongated valve member extending through the port, said valve member having a sealing portion outwardly adjacent to the port and a second portion located in the interior of the steam trap, said valve member movable with respect to the steam trap so as to advance its sealing portion into and away from sealing engagement with the steam trap and to thereby respectively seal and expose the port; and means for moving the sealing portion against and for biasing the sealing portion with variable force into sealing engagement with the steam trap in response to changes in temperature of the fluid as well as for automatically changing the characteristics of said force in different ranges of temperature of the fluid, said moving and biasing means comprising a group of superposed heat-expandible apertured disk-shaped bimetallic elements slidably supported by said valve member intermediate said sealing portion and said second portion, said group of superposed bimetallic elements heatable by the fluid contained in the steam trap for moving said sealing portion into sealing engagement with the steam trap with a sealing force which increases in response to increasing temperature of the fluid and reaches in one range of elevated temperatures a predetermined higher sealing force, and means for transmitting the force generated by the expanding group of superposed bimetallic elements to said valve member, said force transmitting means comprising a pair of motion transmitting assemblies each including apertured dished spring means slidably supported by said valve member, said assemblies disposed at opposite sides of said group of superposed bimetallic elements and each elastically deformable to a predetermined limit by a force at least equal to said predetermined higher sealing force so that said motion transmitting assemblies are deformed by said group of superposed bimetallic elements at least in said range of elevated temperatures, said assemblies being constructed so as to be prevented from further deformation when said limit is reached whereby, when deformed, said assemblies cooperate with the group of superposed bimetallic elements to resist the pressure of fluid and to maintain the sealing portion in engagement with the steam trap, and means for transmitting movement of one of said assemblies to said valve member.

16. A thermostatically actuated valve for sealing with variable force the port of a steam trap in response to changes in temperature of the fluid contained in the steam trap, comprising an elongated valve member extending through the port, said valve member having a sealing portion outwardly adjacent to the port and a second portion located in the interior of the steam trap, said valve member movable with respect to the steam trap so as to advance its sealing portion into and away from sealing engagement with the steam trap and to thereby respectively seal and expose the port; and means for moving the sealing portion against and for biasing the sealing portion with variable force into sealing engagement with the steam trap in response to changes in temperature of the fluid, said moving biasing means comprising first sleeve means slidably supported by said valve member in the steam trap, at least one additional sleeve means slidably supported by said valve member in the steam trap, lost-motion means associated with said sleeve means for transmitting movements thereof to each other and to said valve member but permitting a predetermined amount of lost-motion of said first and additional sleeve means relative to each other, a group of superposed heat-expandible apertured disk-shaped bimetallic elements mounted on one of said sleeve means, and an elastically deformable assembly comprising a plurality of apertured disk-shaped elements slidably mounted on the other of said sleeve means, said group of bimetallic elements expanding in response to increasing temperature of the fluid and exerting at least a part of said variable force upon said valve member through said sleeve means and said assembly under progressive deformation of the latter and under lost-motion of said first and additional sleeve means relative to each other in at least one range of temperature of the fluid, but upon completion of said lost motion, transmitting said variable force to said valve member through said sleeve means directly engaging each other in a further range of temperature of the fluid, whereby the characteristics of said variable force may be changed in different ranges of temperature of the fluid to conform to sealing requirements in said ranges.

17. A valve as set forth in claim 16, further comprising means for initially compressing and for adjusting initial compression of said assembly.

18. A thermostatically actuated valve for sealing with variable force the port of a steam trap in response to changes in temperature of the fluid contained in the steam trap, comprising an elongated valve member extending through the port, said valve member having a sealing portion outwardly adjacent to the port and a second portion located in the interior of the steam trap, said valve member movable with respect to the steam trap so as to advance its sealing portion into and away from sealing engagement with the steam trap and to thereby respectively seal and expose the port; and means for moving the sealing portion against and for biasing the sealing portion with variable force into sealing engagement with the steam trap in response to changes in temperature of the fluid, said moving and biasing means comprising fixed abutment means in the steam trap, first sleeve means slidably supported by said valve member in the steam trap, said sleeve means having a first end portion adapted to abut against said abutment means and a flanged second end portion, at least one additional sleeve means slidably mounted on said valve member in the steam trap, said additional sleeve means having a first end portion adapted to abut the flanged portion of said first sleeve means and a flanged second end portion, means for transmitting movements of said additional sleeve means to the second portion of said valve member, a direct expansion type thermostat including a plurality of apertured disk-shaped bimetallic elements and slidably mounted on one of said sleeve means, said thermostat heatable by the fluid contained in the steam trap for moving the sealing portion into sealing engagement with a force which increases in response to rising temperature of the fluid, and a motion transmitting assembly slidably mounted on the other of said sleeve means and elastically deformable by said thermostat so as to cooperate with said thermostat in resisting the pressure of fluid by maintaining the sealing portion in engagement with the steam trap, said thermostat moving the flanged end portion of said one sleeve means away from said fixed abutment means when expanding in response to rising temperature of the fluid.

19. In a steam trap, in combination, a fluid-containing housing having a port; and a thermostatically actuated valve mounted in said housing and adapted to seal said port in response to changes in temperature of the fluid, said valve comprising a reciprocable stem extending through and having a head outwardly adjacent to said port, said stem comprising an externally threaded end portion located in said housing, an adjusting nut meshing with said end portion, and at least two groups of superposed heat-expandable apertured disk-shaped bimetallic elements slidably supported by said stem intermediate said housing and said nut, the bimetallic elements in one of said two groups generating in response to increasing temperature of said fluid a greater force than that generated by the other group, said groups of superposed bimetallic elements expanding in response to rise in temperature of the fluid so as to produce a sealing force and to transmit the sealing force to said nut whereby the nut moves the head into and thereupon maintains the head in sealing engagement with the housing to seal said port, and so that one of said groups of bimetallic elements deform the other group in response to further increase in temperature of the fluid.

20. In a steam trap, in combination, a fluid-containing housing having a port; and a thermostatically actuated valve mounted in said housing and adapted to seal said port in response to changes in temperature of the fluid, said valve comprising a reciprocable stem extending through and having a head outwardly adjacent to said port, said stem comprising an externally threaded end portion located in said housing, an adjusting nut meshing with said end portion, at least one group of superposed heat-expandable apertured disk-shaped bimetallic elements, and at least one assembly consisting of at least slightly prestressed apertured dished springs, said group of superposed bimetallic elements and said assembly slidably supported by said stem intermediate said housing and said nut, and said group of superposed bimetallic elements adapted to expand so as to move said head into sealing engagement with the housing and to seal said port in response to a predetermined rise in temperature of fluid contained in said housing, said group of superposed bimetallic elements elastically deforming said assembly in response to further rise in temperature of the fluid so as to produce a higher sealing force and to maintain said head in engagement with the housing.

References Cited in the file of this patent

UNITED STATES PATENTS

| 1,834,375 | Bletz | Dec. 1, 1931 |
| 2,912,166 | Domnick | Nov. 10, 1959 |

FOREIGN PATENTS

| 16,905 | Great Britain | July 20, 1909 |